United States Patent [19]

McConnelee et al.

[11] Patent Number: 5,774,326
[45] Date of Patent: Jun. 30, 1998

[54] MULTILAYER CAPACITORS USING AMORPHOUS HYDROGENATED CARBON

[75] Inventors: Paul Alan McConnelee, Schenectady; Kevin Matthew Durocher, Waterford; Richard Joseph Saia, Schenectady, all of N.Y.

[73] Assignee: General Electric Company, Schenectady, N.Y.

[21] Appl. No.: 519,274

[22] Filed: Aug. 25, 1995

[51] Int. Cl.[6] .......................... H01G 4/06; H01G 4/228; H01G 4/236

[52] U.S. Cl. .................. 361/313; 361/306.1; 361/306.3; 361/307; 361/309; 361/314; 361/321.1; 361/321.4; 361/321.5

[58] Field of Search ................................. 361/763, 766, 361/782, 303, 304–305, 306.1, 306.3, 307–309, 311–314, 320–321.5; 29/25.42

[56] References Cited

U.S. PATENT DOCUMENTS

| | | |
|---|---|---|
| 3,184,661 | 5/1965 | Weller et al. . |
| 4,376,329 | 3/1983 | Behn . |
| 4,378,382 | 3/1983 | Behn . |
| 4,508,049 | 4/1985 | Behn et al. . |
| 5,576,925 | 11/1996 | Gorowitz et al. ................... 361/301.2 |

FOREIGN PATENT DOCUMENTS

| | | |
|---|---|---|
| 202806 | 2/1988 | Japan . |
| A1202806 | 8/1989 | Japan . |
| 314218 | 2/1991 | Japan . |

OTHER PUBLICATIONS

U.S. Patent Application, "Low–Profile Capacitor, and Low–Profile Integrated Capacitor/Heatspreader" by Fisher, et al, Ser. No. 08/214,508 filed Mar. 18, 1994.

"Advanced Materials for High Energy Density Capacitors" by SJ Rzad, etal, 1992 IEEE 35th International Power Sources Symposium, Jun. 22–25, 1992, pp. 358–362.

"A New High Temperature Multilayer Capacitor with Acrylate Dieletrics" by Angelo Yializis, et al, IEEE Dec. 1990, vol. 13, No. 4, pp. 611–615.

"Dielectric Properties of Carbon Films from Plasma Enhanced Chemical Vapor Deposition" Davidson et al., Proc. Electrochem. Soc. v. 89–12, pp. 306–316 (no date provided).

"Multilevel DLC (Diamondlike Carbon) Capacitor Structure", JL Davidson, et al, SPIE vol. 871, Space Structures, Power & Power Conditioning (1988), pp. 308–312.

U.S. Patent Application, "Stacking of Three Dimensional High Density Interconnect Modules with Metal Edge Contacts" by by Saia, et al, Ser. No. 08/364,640 filed Dec. 27, 1994.

*Primary Examiner*—Bot L. Ledynh
*Attorney, Agent, or Firm*—Ann M. Agosti; Marvin Snyder

[57] ABSTRACT

A method of fabricating a multilayer capacitor includes depositing a plurality of electrode layers on a substrate alternately with a plurality of amorphous hydrogenated carbon dielectric layers, forming at least two holes in the electrode and dielectric layers with each hole intersecting alternating ones of the electrode layers, and providing an electrically conductive material in each hole for coupling the alternating ones of the electrode layers. Forming the holes can include forming initial holes and then further exposing selected edge portions of the electrode layers by widening dielectric layer portions of the initial holes. Providing the electrically conductive material can include coating surfaces of the holes with an electrically conductive layer and pouring an electrically conductive filler material into the holes. If filler material is poured into the holes, a capacitor lead can be positioned adjacent the filler material and attached by hardening the filler material.

9 Claims, 2 Drawing Sheets

MULTILAYER CAPACITORS USING AMORPHOUS HYDROGENATED CARBON

BACKGROUND OF THE INVENTION

Some technologies are capable of making capacitors more compact than electrolytic capacitors while providing beneficial thermal and electrical characteristics. For example, as disclosed in commonly assigned Fisher et al., "Low-Profile Capacitor and Low-Profile Integrated Capacitor/ Heatspreader," application Ser. No. 08/214,508, filed Mar. 18, 1994, an amorphous hydrogenated carbon dielectric material, frequently referred to as "diamond-like carbon" (DLC), has been used at General Electric Company's Research and Development Center to fabricate multilayer chip capacitors which have a potential for having higher energy storage density than capacitors normally available due to the high dielectric strength of the DLC which permits the use of very thin films. Another multilayer capacitor fabrication technique is described in J. L. Davidson et al., "Multilevel DLC (Diamondlike Carbon) capacitor structure," SPIE Vol. 871 Space Structures, Power, and Power Conditioning 308 (1988).

Multilayer DLC capacitors are typically fabricated by patterning both the electrode layers and the DLC dielectric layers to produce a structure similar to that shown in FIG. 1. When DLC is patterned using a stencil mask during plasma deposition, the thickness uniformity can be degraded by plasma distortions resulting from the topography of the mask. Such degradation can cause the DLC thickness to be as much as 50% thinner at the outer border than in the middle of the defined pattern. If this thickness variation occurs in an active area of the capacitor, the capacitance and voltage breakdown of the device are impaired. To prevent such impairments, the patterned area is often enlarged so that the active area is positioned in a central portion of the DLC layer.

As the topography of the capacitor itself increases with multiple layers (which can include several hundred layers), the ability to lay down both the metal and DLC stencil masks flat on a substrate becomes difficult and pattern definition can be reduced when materials get under the mask. The capacitor yield can thus decrease as the number of layers increases.

When sputtered metal side edges are used to couple electrode layers, the edges often have only 50% step coverage over the vertically patterned DLC stack (i.e., the metal thickness is reduced by 50%), and this low step coverage affects the metal resistance which can increase the dissipation value of the capacitor.

SUMMARY OF THE INVENTION

It would be desirable to have a high yield fabrication process for providing multilayer DLC capacitors having substantially uniform thicknesses of DLC layers.

The present invention is a structure and method of connecting alternate electrode edges of multilayer capacitors. The capacitors are fabricated using amorphous hydrogenated carbon (commonly referred to as diamondlike carbon or DLC) as the dielectric material and electrically conductive material as the electrode layers (capacitor plates). The electrode layers can be patterned using a stencil mask, whereas the DLC dielectric layers can be blanket deposited. After all of the capacitor electrodes and dielectric layers are applied, holes are formed, preferably by laser ablation, through the capacitor layers to expose the edges of alternate electrode layers. The metal edges are then cleaned and further exposed. The electrode layers can be connected by providing an electrically conductive material in the holes. In a preferred embodiment, the conductive material is applied by sputtering a metal seed layer in the holes and filling the holes with a conductive, free-flowing material such as silver epoxy or solder.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

Figure 1:
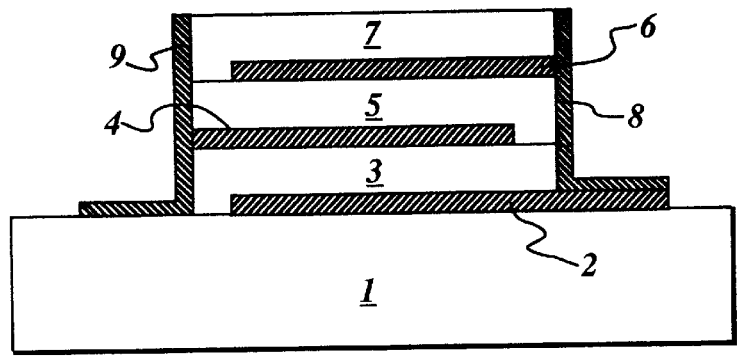
FIG. 1 is a sectional side view of a conventional multilayer capacitor.

FIG. 1 is a sectional side view of a conventional multilayer capacitor of the type discussed above. Substrate 1 supports electrode layers 2, 4, and 6 and DLC dielectric layers 3, 5, and 7. Side edge 8 couples electrode layers 2 and 6, and side edge 9 provides a connection for electrode layer 4. The embodiment of FIG. 1 has the limitations discussed above with respect to patterned electrode and DLC dielectric layers.

Figure 2:
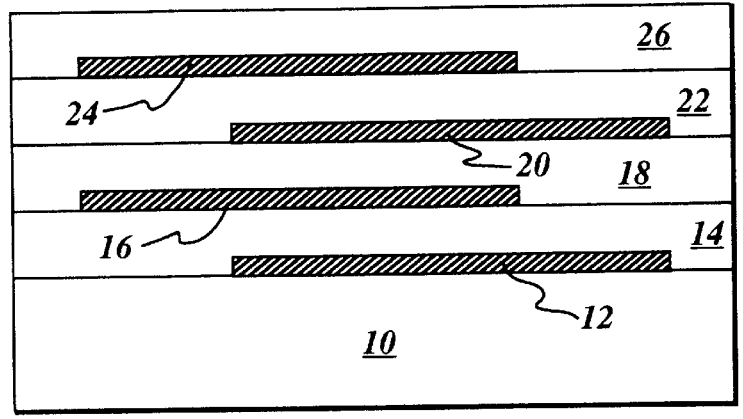
FIG. 2 is a sectional side view of an initial step in fabricating a multilayer capacitor of the present invention.

FIG. 2 is a sectional side view of an initial step in fabricating a multilayer capacitor of the present invention. The invention disclosed herein relates to the use of metal deposition processes and dielectric deposition processes, applied in sequence, on a substrate 10. For example, in one embodiment capacitors are fabricated on a flat stationary or moving surface, in another embodiment a capacitor fabrication fixture (not shown) includes a web of substrate material passing from a supply roll over roll assemblies and to an output roll, and in still another embodiment a capacitor fabrication fixture (not shown) includes a drum with a substrate surrounding a portion of the drum. The capacitor fabrication process includes the use of electrode deposition and dielectric deposition equipment (not shown).

Substrate 10 may comprise a polyimide film such as Kapton polyimide (Kapton is a trademark of E. I. duPont de Nemours & Co.). Preferably the thickness of the substrate ranges from about 0.5 to 5 mils. Other potential substrate films include polyester films, polyetherimides such as Ultem polyetherimide (Ultem is a trademark of General Electric Company), polycarbonates such as Lexan polycarbonate (Lexan is a trademark of General Electric Company), polytetrafluoroethylenes such as Teflon polytetrafluoroethylene (Teflon is a trademark of E. I. duPont de Nemours & Co.), polypropylene, polyethylene terephthalate, and polyethylene.

In a preferred embodiment the substrate material is appropriate for forming smooth, defect-free coatings and allowing adhesion of multilayer films, and the substrate has mechanical and thermal stability during the capacitor fabrication steps and applications.

A process of alternatively depositing electrode layers, shown as electrode layers 12, 16, 20, and 24 and insulator layers, shown as dielectric layers 14, 18, 22, and 26, is repeated until the desired capacitance per unit area value is achieved. For simplicity, only four electrode layers separated by three dielectric layers 14, 18, and 22 and covered by an outer dielectric layer 26, are shown. It is expected that a number of additional electrode and dielectric layers will be used in actual applications. The active area of the capacitor is the area of overlap between the electrode layers.

The dielectric layers comprise hydrogenated amorphous carbon, referred to as DLC. The thickness of a dielectric layer is dictated by the desired voltage breakdown rating of the capacitor and typically is a thickness of 4 micrometers or less.

The electrode layers may comprise electrically conductive layers such as aluminum, titanium, molybdenum, nickel, copper, chromium, gold, silver, platinum, stainless steel, titanium nitride and combinations thereof. The electrode layers can typically be applied by evaporation, sputtering, other forms of physical vapor deposition, electroplating, or laser or plasma assisted CVD. The thickness of an electrode layer typically ranges from about 250 to 1500 angstroms. Preferably appropriate stencil masks (not shown) are placed over previously applied layers for use in patterning the metal electrode layers.

Figure 3:
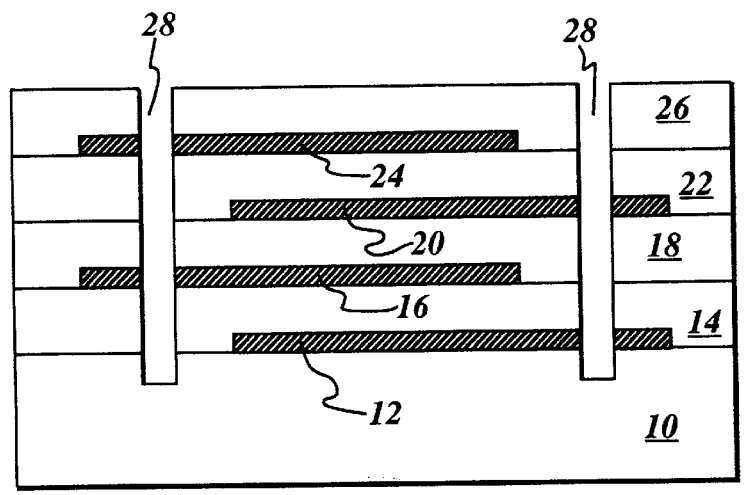
FIG. 3 is a view similar to that of FIG. 2, further showing two holes in the capacitor layers.

FIG. 3 is a view similar to that of FIG. 2, further showing two holes 28 in the capacitor layers. After the dielectric and electrode layers are applied, holes 28 are formed through the capacitor layers. The electrode layers are patterned such that the holes can be positioned to intersect with alternating ones of the electrode layers. Although two holes are shown for simplicity, if desired, additional holes can be formed with each hole intersecting alternating electrode layers.

In one embodiment, the holes can be formed using an excimer laser. Other methods for forming holes through electrode and dielectric layers include, for example, using a mechanical cutting instrument such as a razor blade or saw. The term "hole" is meant to encompass cuts, slices, and other openings of any shape which expose the electrode and dielectric layers.

Figure 4:
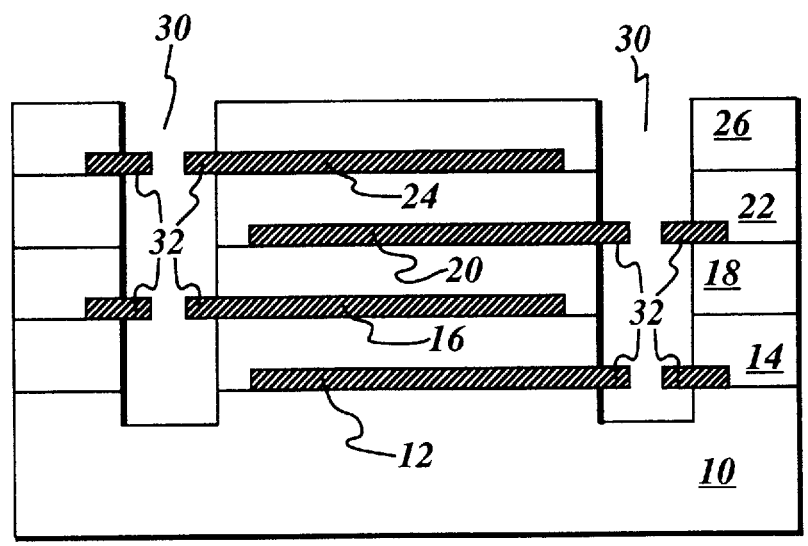
FIG. 4 is a view similar to that of FIG. 3, further showing the holes after they have been widened to further expose portions of the capacitor electrode layers.

FIG. 4 is a view similar to that of FIG. 3, further showing holes 30 after dielectric portions of holes 28 of FIG. 3 have been widened to further expose edge portions 32 of capacitor electrode layers 12, 16, 20, and 24. Although widening of the holes is not required, it is very useful for later making a solid connection to the electrode layers. In one embodiment, an oxygen plasma etching technique can be used to further expose edge portions 32 by a lateral etch of the DLC layers. This etching technique is especially useful if excimer laser ablation was used to form the holes because the etch can simultaneously clean soot resulting from the ablation.

Figure 5:
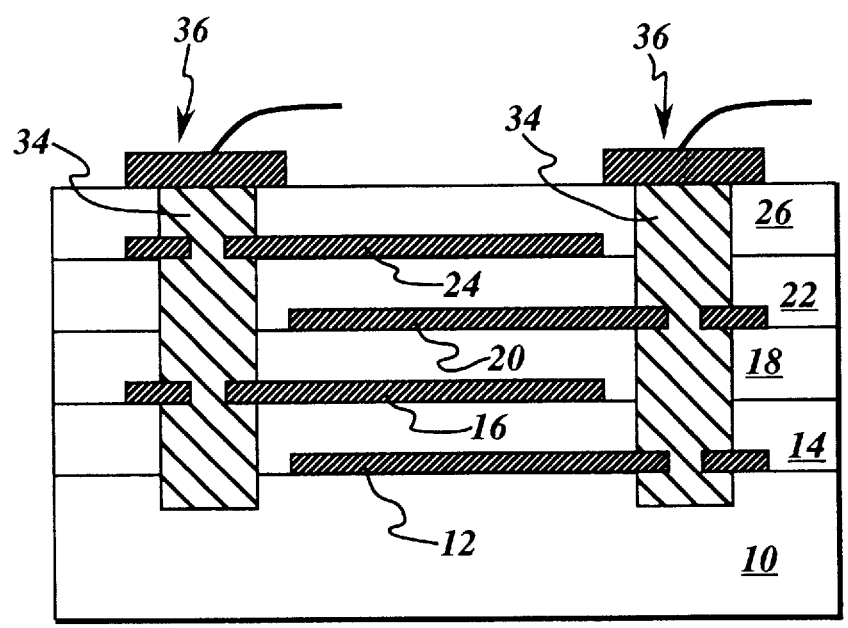
FIG. 5 is a view similar to that of FIG. 4, further showing electrically conductive material in the holes coupling alternating ones of the electrode layers.

FIG. 5 is a view similar to that of FIG. 4, further showing electrically conductive material 34 in holes 30 coupling alternate edge portions 32 of the electrode layers 12, 16, 20, and 24.

Preferably conductive material 34 is fabricated by applying an adhesion promoting, electrically conductive seed layer followed by supplying a free-flowing filler material such as silver epoxy or solder. In one embodiment, the seed layer is sputtered through a stencil mask and the free-flowing material is poured. If a free-flowing material is used for conductive material 34, after the material is poured, but before it hardens, external leads 36 can conveniently be attached to the capacitor device without using an additional adhesion step.

Capacitor leads 36 may comprise electrically conductive materials capable of withstanding the environment in which the capacitor will be used, such as, for example, copper, gold, or aluminum. If the capacitor leads are attached to conductive material 34 when it is in solid form, a conductive adhesive capable of holding the leads in place and remaining conductive in the end-use environment can be used.

If the edge portions were not further exposed in the manner discussed with respect to FIG. 4, a process such as "schoopping" can be used to obtain a sufficiently thick seed layer for making contact with the edge surfaces of the electrode layers. This technique of schoopping can also be useful if it is desired in a particular application to omit the step of filling an underlying metal layer with free-flowing material.

EXAMPLE

The invention was tested by using five blanket-deposited DLC layers approximately 3 micrometers thick and five patterned electrode layers comprising 1000 Å of aluminum coated by 100 Å of molybdenum. Edge connection to all electrode layers of the capacitor was obtained by ablating holes using an excimer laser with 10 passes at 60 millijoules and 30 hertz. An $O_2$ plasma etch was used to clean the laser soot and further expose edge portions of the electrode layers.

For electrode edge portion connection, a layer of titanium having a thickness of about 1000 Å was sputtered, and a layer of copper having a thickness of about 3000 Å was sputtered over the titanium. Silver epoxy from Ablestik Electronic Materials and Adhesives under catalog name Ablebond 84-1LMIS was then poured into the holes. The electrical interface did not degrade after 100 thermal cycles from −60° C. to 150° C.

In other successful tests the electrode layers consisted of molybdenum having a thickness of 1000 Å without an underlying layer of aluminum and a $CF_4/O_2$ plasma etch was used to further expose the electrode layer edge portions.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A multilayer capacitor comprising:
   a substrate;
   a plurality of metal electrode layers mounted on the substrate alternately with a plurality of dielectric layers, each dielectric layer comprising amorphous hydrogenated carbon, the electrode layers and the dielectric layers capable of acting as a capacitor and having at least two holes therein, each hole intersecting respective alternating ones of the electrode layers; and
   an electrically conductive material situated in each hole for coupling the respective alternating ones of the electrode layers.

2. The capacitor of claim 1, wherein each of the electrode layers comprises molybdenum.

3. The capacitor of claim 1, wherein each of the electrode layers has at least one edge portion extending into a respective one of the holes.

4. The capacitor of claim 1, wherein the electrically conductive material comprises an electrically conductive layer coating surfaces of the holes.

5. The capacitor of claim 4, wherein the electrically conductive layer comprises a titanium layer coating the surfaces of the holes and a copper layer coating the titanium layer.

6. The capacitor of claim 5, wherein the electrically conductive material further comprises an electrically conductive filler material in the holes.

7. The capacitor of claim 6, wherein the filler material comprises silver epoxy or solder.

8. A multilayer capacitor comprising:

(a) a substrate;

(b) a plurality of electrode layers mounted on the substrate alternately with a plurality of dielectric layers, each electrode layer comprising a metal, each dielectric layer comprising amorphous hydrogenated carbon, the electrode layers and the dielectric layers having at least two holes therein, each hole intersecting respective alternating ones of the electrode layers, each electrode layer having at least one edge portion extending into a respective one of the holes;

and (c) an electrically conductive material situated in each hole for coupling the respective alternating ones of the electrode layers.

9. The capacitor of claim 8, wherein the electrically conductive material comprises an electrically conductive layer coating surfaces of the holes and an electrically conductive filler material filling the holes.

* * * * *